Patented Oct. 10, 1950

2,524,977

UNITED STATES PATENT OFFICE 2,524,977

VULCANIZING WITH QUINONE OXIMES

Frederic L. Holbrook and Irving E. Cutting, Naugatuck, Conn., assignors to United States Rubber Company, New York, N. Y., a corporation of New Jersey No Drawing. Application February 12, 1947, Serial No. 728,210

7 Claims. (Cl. 260—85.1)

This invention relates to the vulcanization of rubber, either natural or synthetic, especially to the use of quinone oximino compounds therefor, and in particular to a means of controlling the premature vulcanization or scorching frequently caused by such agents.

The quinone oximino compounds have been disclosed as vulcanization agents for natural and synthetic rubbers by Fisher U. S. Patent No. 2,170,191, and as vulcanization agents for the copolymers of isobutylene with diolefins by Haworth U. S. Patent No. 2,393,321. These materials, especially p-quinone dioxime and p-quinone dioxime dibenzoate, while producing vulcanizates eminently satisfactory in respect to tensile strength and modulus, have the disadvantage of causing premature vulcanization or scorching, resulting in rubber compounds unsuitable for fabrication. Roberts U. S. Patent No. 2,391,742 has shown that this scorchiness can be remedied in part by the use of thiuram type compounds as retarders.

Scorch is defined as a premature partial vulcanization of the stock brought about by heat present or developed during processing. A scorched stock is no longer completely thermoplastic and cannot be smoothly sheeted or extruded.

Scorch life is a measure of the time during which the rubber may be safely processed. This time will depend in part on the type of rubber and the rubber compounding recipe but largely on the processing temperature and the type of vulcanization accelerator used. A measure of the scorch life may be obtained by curing the stock at a low temperature such as 5 or 10 pounds per square inch steam pressure and subsequently tensiling.

We have found that by adding an aromatic polyamine to a rubber mix, and especially to a carbon black compounded rubber mix, which is to be vulcanized with any member of the above referred to and disclosed quinone di-oximino class of vulcanization agents, that the rate of cure can be greatly reduced and scorching prevented. This retardation by aromatic polyamines is unexpected in view of the fact that aromatic polyamines function as activators in the conventional sulfur-type cures. The aromatic polyamines also are superior to the aromatic monoamines as retarders for the quinone di-oximino class of non-sulfur vulcanization agents.

Typical examples, among others, of useful aromatic polyamines are various primary, secondary, and tertiary polyamines as exemplified by o-phenylene diamine, p-phenylene diamine, m-phenylene diamine, o-tolylene diamine, N,N'-dimethyl p-phenylene diamine, p-amino dimethyl aniline, 1,4-naphthalene diamine, 3,4-diamino diphenyl, benzidine, tetramethyl benzidine, 4,4'-diamino diphenyl dimethyl methane, 4,4'-diamino diphenyl methane, N,N,N',N'-tetramethyl diamino diphenyl methane, etc. The amount of the amine to be used can be easily determined experimentally for each rubber and rubber vulcanizing agent, and in general varies by weight from 0.1 part to 10 parts based upon 100 parts of the rubber hydrocarbon.

Typical noteworthy examples of quinone oximino compounds, are p-benzoquinone dioxime, o-benzo quinone dioxime, 1,4-naphthoquinone dioxime, p-benzoquinone dioxime dibenzoate, p-benzoquinone dioxime diacetate, p-benzoquinone dichlorocarbonate, p - benzoquinone monoxime, p-toluquinone monoxime.

The following examples, in which the parts are by weight, illustrate the invention, it being understood that the invention is not to be limited thereto.

EXAMPLE 1

Natural rubber and the 75/25 rubbery copolymer of butadiene and styrene, were cured with a combination of p-quinone dioxime and 4,4'-diamino diphenyl methane as follows:

*Master batch A*

| | |
|---|---|
| Smoked sheet | 100 |
| Carbon black | 45 |
| Petrolatum | 5 |
| Zinc oxide | 5 |
| Sulfur | 3 |
| Red lead | 8 |
| Quinone dioxime | 2 |
| | 168 |

*Master batch B*

| | |
|---|---|
| Copolymer | 100 |
| Carbon black | 50 |
| Zinc oxide | 5 |
| Petrolatum | 5 |
| Sulfur | 2 |
| Red lead | 8 |
| Quinone dioxime | 2 |
| | 172 |

| | A | B | C | D |
|---|---|---|---|---|
| Master Batch A | 168 | 168 | | |
| Master Batch B | | | 172 | 172 |
| p,p'-Diamino diphenyl methane | | 3.0 | | 3.0 |

Cure: 60' and 90' at 45 p. s. i. steam pressure.

Tensiles

| Minutes Cure at 45 p. s. i. steam pressure | Per Cent Elongation | A | B | C | D |
|---|---|---|---|---|---|
| 60 | 300 | | 2,630 | | 1,850 |
| | Break | 2,680–275 | 2,930–323 | 1,800–240 | 1,960–320 |
| 90 | 300 | | 2,510 | | 1,950 |
| | Break | 2,840–290 | 2,800–340 | 1,800–243 | 1,950–300 |

Scorch tensiles at 5 lbs. p. s. i.

| Minutes Cure at 5 p. s. i. steam pressure | A | | B | | C | | D | |
|---|---|---|---|---|---|---|---|---|
| | T | E | T | E | T | E | T | E |
| 5 | 730 | 610 | 460 | 690 | 586 | 436 | 80 | 586 |
| 10 | 953 | 566 | 536 | 670 | 720 | 396 | 80 | 576 |
| 20 | 1,340 | 506 | 830 | 596 | 963 | 400 | 80 | 723 |

T=tensile. E=elongation.

These data show that diamino diphenyl methane has a retarding effect upon the scorch of quinone dioxime at low temperatures without adversely affecting the final cured tensile strengths.

EXAMPLE 2

The rubbery copolymer of isobutylene and isoprene is cured with combinations of p-quinone dioxime and p,p'-diamino diphenyl methane, p,p'-tetramethyl diamino diphenyl methane, p-phenylene diamine, and benzidine.

Master batch C

| | |
|---|---|
| Copolymer | 100 |
| Carbon black | 60 |
| Zinc oxide | 30 |
| Petrolatum | 3 |
| Paraffin wax | 2 |
| Red lead | 8 |
| Sulfur | 2 |
| p-Quinone dioxime | 2 |
| | 207 |

| | E | F | G | H |
|---|---|---|---|---|
| Above master batch | 207 | 207 | 207 | 207 |
| p,p'-Diamino diphenyl methane | | 1.5 | | |
| p,p'-Tetramethyl diamino diphenyl methane | | | 1.5 | |
| Benzidine | | | | 1.5 |

Cures 60' and 90' at 45 p. s. i. steam pressure.

Tensiles

| Minutes Cure at 45 p. s. i. steam pressure | Per Cent Elongation | E | F | G | H |
|---|---|---|---|---|---|
| 60 | 300 | 1,340 | 850 | 1,025 | 785 |
| | Break | 1,440–336 | 1,180–413 | 1,280–373 | 1,080–440 |
| 90 | 300 | | 975 | 1,140 | 820 |
| | Break | 1,460–293 | 1,275–400 | 1,350–373 | 1,080–433 |

Scorch tensiles at 5 lbs. p. s. i.

| Minutes Cure at 5 p. s. i. steam pressure | E | | F | | G | | H | |
|---|---|---|---|---|---|---|---|---|
| | T | E | T | E | T | E | T | E |
| 20 | 203 | 843 | 95 | 1,300 | 83 | 1,070 | 83 | 1,123 |
| 30 | 346 | 796 | 95 | 1,420 | 83 | 1,526 | 83 | 990 |
| 45 | 540 | 703 | 83 | 1,550 | 83 | 1,553 | 80 | 1,553 |

T=tensile. E=elongation.

These data show diamino diphenyl methane, tetramethyl diamino diphenyl methane, and benzidine to be excellent antiscorchers for p-quinone dioxime.

EXAMPLE 3

The copolymer of isobutylene and isoprene is cured with combinations of p-quinone dioxime dibenzoate and p,p'-diamino diphenyl methane.

Master batch D

| | |
|---|---|
| Copolymer | 100 |
| Carbon black | 60 |
| Zinc oxide | 30 |
| Petrolatum | 3 |
| Paraffin wax | 2 |
| Red lead | 8 |
| Sulfur | 2 |
| p-Quinone dioxime dibenzoate | 6 |
| | 211 |

| | I | J |
|---|---|---|
| Above master batch | 211 | 211 |
| p,p'-diamino diphenyl methane | | 1.0 |

Cures 60' and 90' at 45 lbs. p. s. i. steam pressure.

Tensiles

| Minutes Cure at 45 p. s. i. steam pressure | Per Cent Elongation | I | J |
|---|---|---|---|
| 60 | 300 | 1,370 | 1,280 |
| | Break | 1,400–323 | 1,690–406 |
| 90 | 300 | 1,475 | 1,375 |
| | Break | 1,630–340 | 1,740–383 |

Scorch tensiles at 10 lbs. p. s. i.

| Minutes Cure at 10 p. s. i. steam pressure | I | | J | |
|---|---|---|---|---|
| | T | E | T | E |
| 10 | 40 | 2,013 | 40 | 2,686 |
| 20 | 410 | 1,066 | 73 | 2,100 |

T=tensile. E=elongation.

While the invention has been described in particular detail for the systems, natural rubber, rubbery copolymer of butadiene and styrene, rubbery copolymer of isobutylene and a conjugated diene such as butadiene-1,3 or isoprene, which copolymers are respectively known under the names of GR–S and GR–I, it is equally applicable to other natural occurring rubbery materials such as balata and gutta percha and to other synthetic rubber-like materials formed by the homopolymerization of butadienes-1,3 such as butadiene-1,3, methyl-2-butadiene-1,3 (isoprene), piperylene, 2,3-dimethyl-butadiene-1,3, as well as to the polymerized rubber-like material derived from a mixture of such butadienes-1,3 with other polymerizable compounds which are capable of forming rubbery copolymers with butadienes-1,3, for example, up to 70% of such mixture of compounds which contain a $CH_2=C<$ group where at least one of the disconnected valences is attached to an electro-active group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene, the alpha methylene carboxylic acids and their esters, nitriles and amides such as acrylic acid, methyl acrylate, methyl methacrylate, acrylonitrile, methacrylonitrile, methacrylamide, isobutylene, methyl vinyl ether, methyl vinyl acetone.

Accordingly, the expression "a rubber composition" is intended to include natural as well as the various synthetic rubbers which are amenable to cure with the quinone oximino compounds.

As shown in the examples, the usual rubber compounding pigments, fillers and softeners may be used in rubber stocks accelerated with the combinations of this invention. The carbon black may be of the basic or acidic type as exemplified by high modulus furnace black and easy processing channel black. The rubber stocks prepared in this manner are useful in the manufacture of automobile tires, tubes, hose, belting, sheet and thread rubber, rubberized fabrics, molded goods, boots and shoes, etc., whether vulcanized in the mold, or in open steam, or in hot air.

The use of sulfur in conjunction with the quinone oximino compound is optional. In the examples given for a curing bag, sulfur is added because in such use the tendency of the curing bag to "rob" the tire of its sulfur, during the cure of the tire, is reduced.

While we have shown and described various embodiments of the invention, it is to be understood that the invention is susceptible to other modifications which appear within the spirit of the invention and the scope of the appended claims.

Having thus described our invention, what we claim and desire to protect by Letters Patent is:

1. An uncured rubber composition selected from the class consisting of natural rubber, rubbery copolymers of butadiene-1,3 and styrene, rubbery copolymers of isoprene and isobutylene, and rubbery copolymers of butadiene-1,3 and isobutylene, comprising a carbon black as a reinforcing agent, a quinone oximino compound as a curing agent, and additionally an aromatic polyamine having the formula

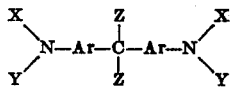

where X and Y represent a member from the class consisting of hydrogen and alkyl; Z is a member from the class consisting of hydrogen and alkyl; and Ar represents an aromatic nucleus.

2. An uncured rubber composition selected from the class consisting of natural rubber, rubbery copolymers of butadiene-1,3 and styrene, rubbery copolymers of isoprene and isobutylene, and rubbery copolymers of butadiene-1,3 and isobutylene, comprising a carbon black as a reinforcing agent, a quinone oximino compound as a curing agent, and additionally 4,4'-diamino diphenyl methane.

3. An uncured rubber composition selected from the class consisting of natural rubber, rubbery copolymers of butadiene-1,3 and styrene, rubbery copolymers of isoprene and isobutylene, and rubbery copolymers of butadiene-1,3 and isobutylene, comprising a carbon black as a reinforcing agent, a quinone oximino compound as a curing agent, and additionally N,N,N',N'-tetramethyl diamino diphenyl methane.

4. An uncured composition of a rubbery copolymer of isobutylene and a 1,3-butadiene comprising, in addition to the copolymer, a carbon black as a reinforcing agent, a quinone oximino compound as a curing agent, and additionally an aromatic polyamine having the formula

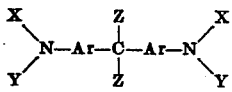

where X and Y represent a member from the class consisting of hydrogen and alkyl; Z is a member from the class consisting of hydrogen and alkyl; and Ar represents an aromatic nucleus.

5. An uncured composition of a rubbery copolymer of isobutylene and a 1,3-butadiene comprising, in addition to the copolymer, a carbon black as a reinforcing agent, a quinone oximino compound as a curing agent, and additionally 4,4'-diamino diphenyl methane.

6. An uncured composition of a rubbery copolymer of isobutylene and a 1,3-butadiene comprising, in addition to the copolymer, a carbon black as a reinforcing agent, a quinone oximino compound as a curing agent, and additionally N,N,N',N'-tetramethyl diamino diphenyl methane.

7. An uncured composition of a rubbery copolymer of isobutylene and a conjugated diolefin hydrocarbon comprising, in addition to the copolymer, a quinone oximino compound as a curing agent, and additionally an aromatic polyamine having the formula

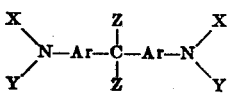

where X and Y represent a member from the class consisting of hydrogen and alkyl; Z is a member from the class consisting of hydrogen and alkyl; and Ar represents an aromatic nucleus.

FREDERIC L. HOLBROOK.
IRVING E. CUTTING.

REFERENCES CITED

The following references are of record in the file of this patent:

UNITED STATES PATENTS

| Number | Name | Date |
| --- | --- | --- |
| 2,170,191 | Fisher | Aug. 22, 1939 |
| 2,393,321 | Haworth | Jan. 22, 1946 |